(12) United States Patent
Puschnik et al.

(10) Patent No.: US 9,764,285 B2
(45) Date of Patent: Sep. 19, 2017

(54) EXHAUST GAS CLEANING DEVICE

(71) Applicant: AVL LIST GMBH, Graz (AT)

(72) Inventors: Andreas Puschnik, Graz (AT); Thomas Cartus, Seiersberg (AT); Karl Wieser, Graz (AT); Michael Zallinger, Stainztal (AT); Thomas Sacher, Graz (AT)

(73) Assignee: AVL List GmbH, Graz (AT)

( * ) Notice: Subject to any disclaimer, the term of this patent is extended or adjusted under 35 U.S.C. 154(b) by 390 days.

(21) Appl. No.: 14/432,088

(22) PCT Filed: Oct. 8, 2013

(86) PCT No.: PCT/EP2013/070890
§ 371 (c)(1),
(2) Date: Mar. 27, 2015

(87) PCT Pub. No.: WO2014/056877
PCT Pub. Date: Apr. 17, 2014

(65) Prior Publication Data
US 2015/0238901 A1    Aug. 27, 2015

(30) Foreign Application Priority Data

Oct. 8, 2012    (AT) .................................. 50432/2012

(51) Int. Cl.
*B01D 53/94*    (2006.01)
*F01N 3/20*    (2006.01)

(52) U.S. Cl.
CPC ..... *B01D 53/9431* (2013.01); *B01D 53/9477* (2013.01); *F01N 3/2066* (2013.01);
(Continued)

(58) Field of Classification Search
None
See application file for complete search history.

(56) References Cited

U.S. PATENT DOCUMENTS 7,877,983 B2    2/2011 Künk
8,499,548 B2    8/2013 De Rudder et al.
(Continued)

FOREIGN PATENT DOCUMENTS

GB    2465151    5/2010
WO    2011147556    12/2011

*Primary Examiner* — Walter D Griffin
*Assistant Examiner* — Jelitza Perez
(74) *Attorney, Agent, or Firm* — Dykema Gossett PLLC

(57) ABSTRACT

The invention relates to an exhaust gas cleaning device (2) for an internal combustion engine, with an injection module (1) for a reduction agent, particularly urea, having a housing (3) with a main chamber (4), in which main chamber (4) a mixing tube (5) is arranged downstream of a metering chamber (6) into which the reduction agent is injected by means of an injection device (11). The injection module (1) for exhaust gas has at least one first inlet (8) into the main chamber (4) and at least one first outlet (7b) out of the mixing tube (5). In order to achieve a high exhaust gas quality in as simple and space-saving a manner as possible, the metering chamber (6) has at least one second inlet (12) for exhaust gas, the main chamber (4) has at least one second outlet (9) for exhaust gas, and the main chamber (4) is separated in a gas-tight manner from the metering chamber (6) and from the interior (5a) of the mixing tube (5).

10 Claims, 3 Drawing Sheets

(52) U.S. Cl.
CPC ...... *F01N 2470/00* (2013.01); *F01N 2610/02* (2013.01); *F01N 2610/1453* (2013.01); *Y02T 10/24* (2013.01)

(56) References Cited

U.S. PATENT DOCUMENTS

| | | |
|---|---|---|
| 8,539,758 B2 | 9/2013 | Müller-Haas |
| 8,596,049 B2 | 12/2013 | Isada et al. |
| 2011/0146253 A1* | 6/2011 | Isada ............ F01N 3/2073 60/302 |
| 2011/0308234 A1 | 12/2011 | De Rudder et al. |

* cited by examiner

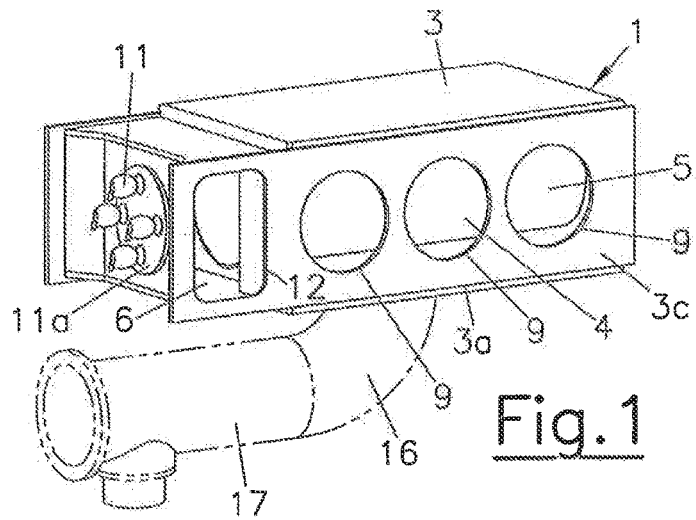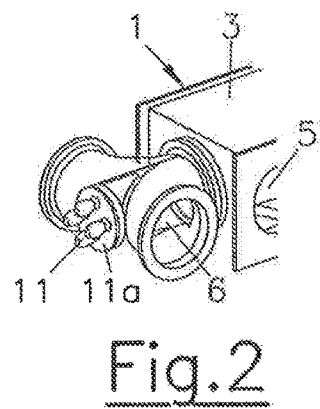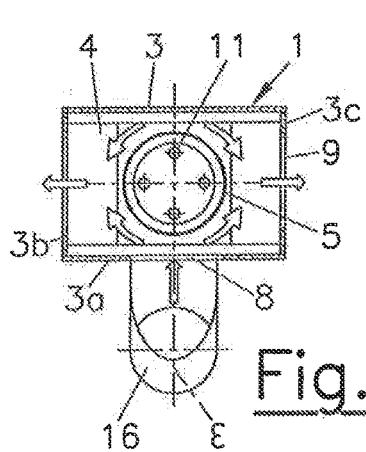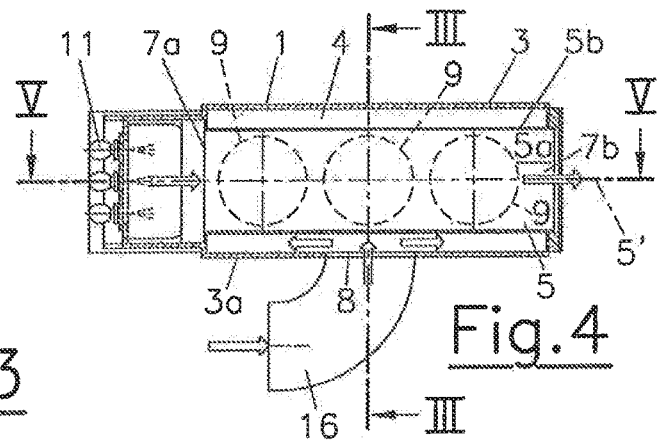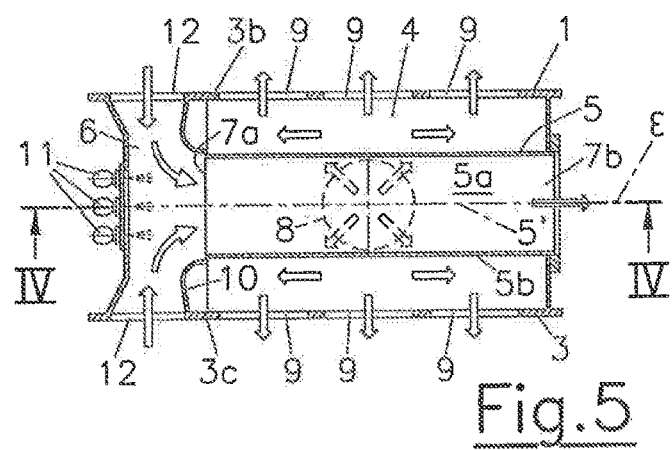

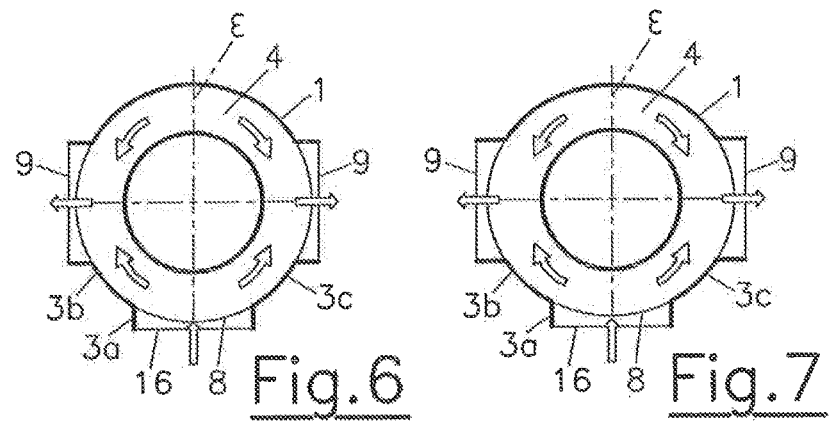
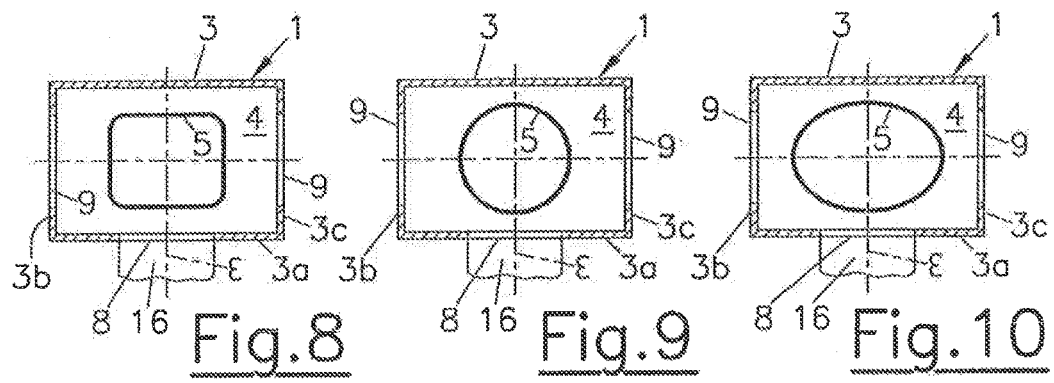
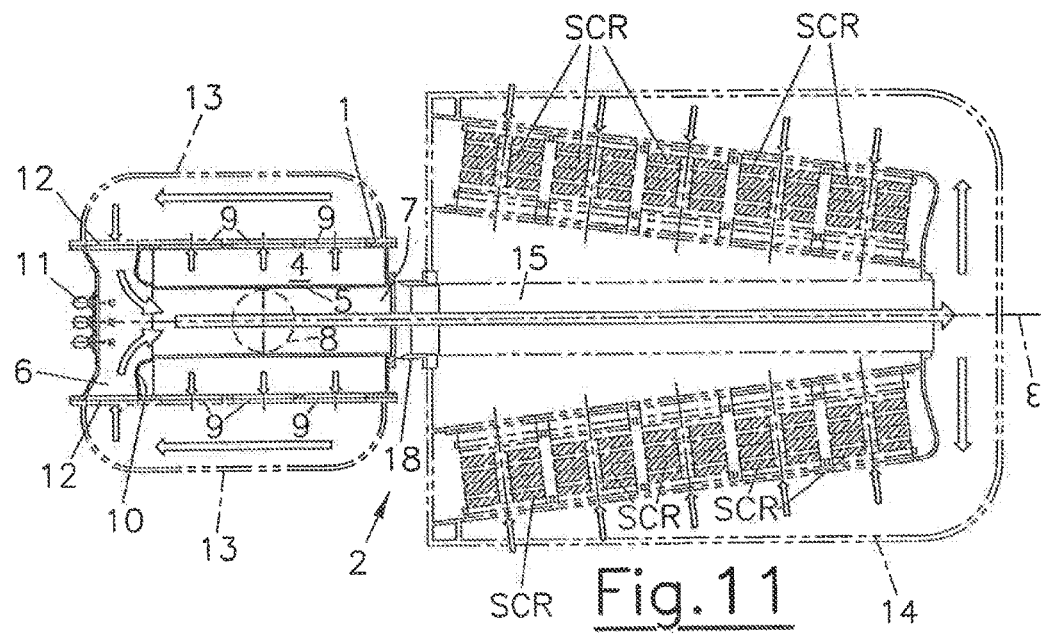

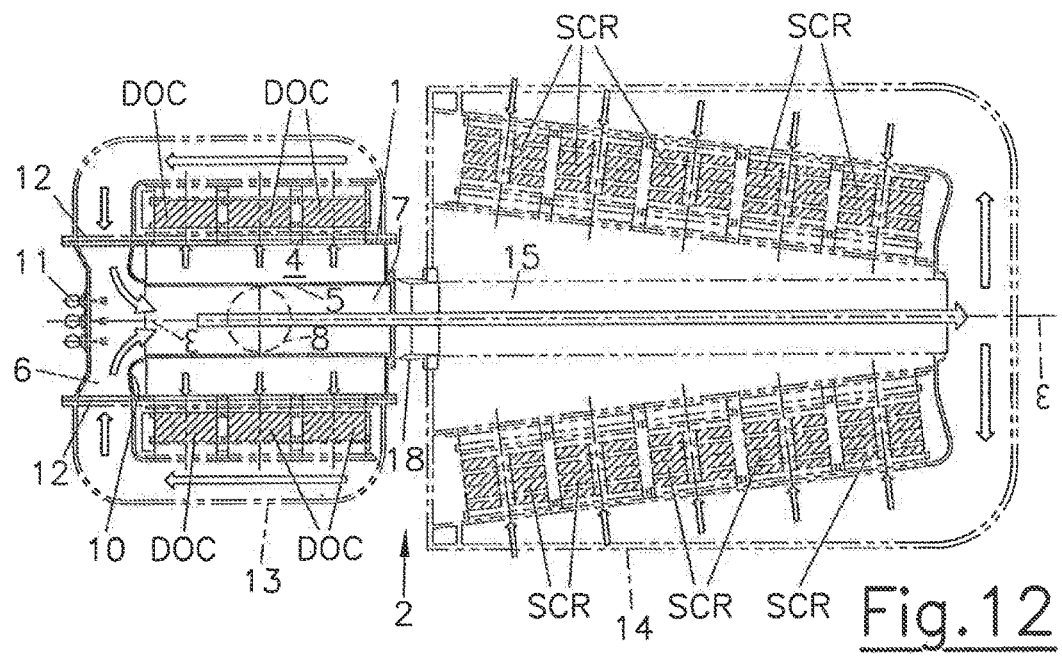
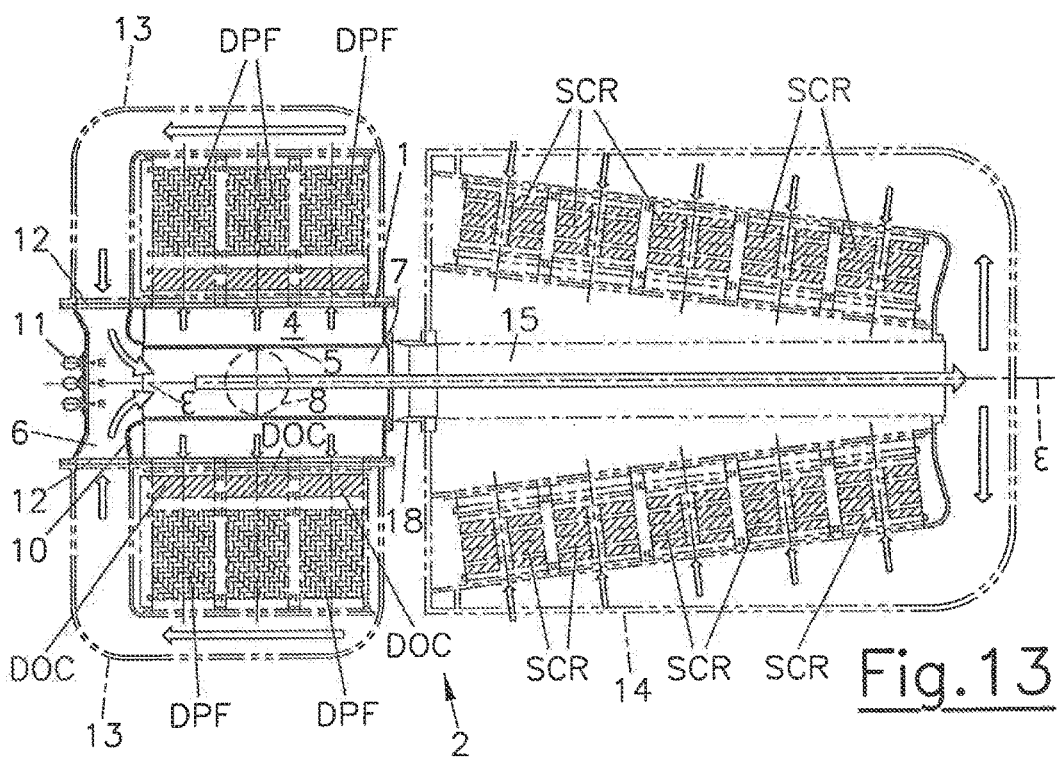

EXHAUST GAS CLEANING DEVICE

BACKGROUND OF THE INVENTION

Field of the Invention

The invention relates to an exhaust gas purification device for an internal combustion engine having an injection module for a reducing agent, in particular urea, having a housing comprising a main chamber, in which main chamber a mixing tube is arranged downstream from a metering chamber, into which the reducing agent is injected via at least one injection device, wherein the injection module for exhaust gas comprises at least one first inlet into the main chamber and at least one first outlet from the mixing tube.

The Prior Art

An exhaust gas purification device for an internal combustion engine is known from GB 2 465 151 A, which comprises a housing, in which a particle filter and a metering chamber are arranged, wherein an injection device discharges into the metering chamber. The housing spans a main chamber, in which a mixing tube is arranged between the metering chamber and an outlet for the exhaust gas. The housing furthermore comprises an inlet for exhaust gas. In this case, entering exhaust gases at least partially flow around the mixing tube.

WO 2011/087 550 A2 discloses an exhaust gas posttreatment module for an internal combustion engine, which module comprises a plurality of inlets, wherein an Injection device for a reducing agent is arranged at the beginning of the mixing tube. The mixing tube is housed in a housing of the module, furthermore SCR catalytic converters (SCR: selective catalytic reduction) are arranged in the housing on both sides of the mixing tube. The exhaust gas flows via a diffuser-type inlets into the mixing tube and from them reaches—after a 180° deflection—SCR catalytic converters, from which the exhaust gas flows along the outer lateral surface of the mixing tube inside the housing to flow outlets in the housing. The Inlets and the outlets are arranged on the same end side of the module. The arrangement requires a large amount of installation space. Since the mixing tube is only jacketed by the exhaust gas after the reducing agent is admixed, deposits can occur inside the mixing tube—due to excessively low wall temperature—in the event of unfavorable operating conditions, for example, low load.

WO 2010/078052 A1 discloses an exhaust gas posttreatment device for an internal combustion engine having a metering device for a reducing agent which is arranged in a housing. The housing comprises an inlet and an outlet for exhaust gas, wherein the exhaust gases are supplied via the Inlet to the housing and, after flowing through a filter substrate arranged in the housing, reach a flow mixer, where reducing agent is added to the exhaust gas via the metering device. The exhaust gas admixed with reducing agent then flows out of the housing again through a central outlet. A gas-tight separation of main chamber and mixing tube is not provided. Similar exhaust gas purification devices are known from documents WO 2006/014129 A1 and DE 10 2008 048 796 A1.

The object of the invention is to ensure rapid vaporization of the reducing agent in a simple and compact manner.

SUMMARY OF THE INVENTION

This is achieved according to the invention in that the metering chamber comprises at least one second inlet for exhaust gas and the main chamber comprises at least one second outlet for exhaust gas and the main chamber is separated in a gas-tight manner from the metering chamber and from the interior of the mixing tube. Because the main chamber is completely separated from the metering chamber, hot exhaust gas flows around the mixing tube optimally, and it is heated better than in known devices. More rapid vaporization of the injected reducing agent is thus achieved and deposits in the mixing tube are prevented.

It is preferably provided in this case that at least one separating wall is arranged between main chamber and metering chamber. The separating wall between metering chamber and main chamber prevents hot exhaust gas from flowing directly from the main chamber into the metering chamber. Rather, the exhaust gas—after flowing around the mixing tube—leaves the main chamber through separately provided second outlets. It is particularly advantageous in this case if the main chamber comprises at least two second outlets arranged on different sides of a longitudinal plane of symmetry of the injection module.

It is particularly advantageous in this case if at least two inlets are provided, which are arranged on different sides of the longitudinal plane of symmetry of the injection module. At least one injection device, but preferably also two, three, four, or more injection devices can discharge into the metering chamber in the region of the longitudinal plane of symmetry. In this case, conventional injection nozzles from the utility vehicle field can be used.

To achieve optimum heating of the mixing tube, the main chamber predominantly, preferably entirely encloses the lateral surface of the mixing tube.

The mixing tube and the main chamber—viewed in the longitudinal direction of the axis of the mixing tube—can have circular, oval, rectangular, or other conceivable cross-sectional shapes.

It is particularly advantageous if the exhaust gas purification device has a modular construction. It is thus provided in a preferred embodiment variant of the invention that at least one connecting module is flanged onto the injection module, preferably on one side of the injection module, wherein the connecting module forms a flow connection of the second outlet from the main chamber and the second inlet into the metering chamber. The connecting module can comprise at least one catalytic converter, preferably a diesel oxidation catalytic converter, and/or at least one particle filter. The connecting module establishes the flow connection between the main chamber and the metering chamber. The exhaust gas is conducted in this case, coming from the main chamber, via the second outlets into the connecting module, flows through oxidation catalytic converters and/or particle filters which are possibly provided here, and is conducted further to the second inlet into the metering chamber. In this case—viewed in reference to a longitudinal plane of symmetry of the injection module—a connecting module can be flanged on in each case on each side of the injection module.

In a further embodiment, it can be provided that at least one catalytic converter module having at least one catalytic converter, preferably an SCR catalytic converter, is connected to the first outlet from the mixing tube.

The first part of the mixing tube is positioned in the injection module so that the hot engine exhaust gas flows around the mixing tube, to keep the wall temperature high in all operating conditions. Due to the higher temperature, rapid vaporization of the reducing agent occurs and fewer deposits result in the mixing tube.

The hot exhaust gas is firstly conducted into the main chamber in this case to heat up the mixing tube. The exhaust gas then exits from the main chamber again and reaches the metering chamber of the injection module via the connecting module, where the reducing agent is metered in. Complete vaporization of the reducing agent can be achieved in the hot mixing tube, before the exhaust gas is supplied to the SCR catalytic converters of the catalytic converter module.

The symmetrical inflow of the exhaust gas into the metering chamber for the injection of the reducing agent promotes the vaporization and mixing with the reducing agent. An additional mixer can thus be omitted and/or the overall length of the mixing tube can be dimensioned shorter. A more compact construction is therefore possible.

The modular construction enables the same design to be used for various applications, for example, for stationary engines or for marine uses.

BRIEF DESCRIPTION OF THE DRAWINGS

The invention will be explained in greater detail by reference to the drawings, wherein:

FIG. 1 shows an injection module of an exhaust gas purification device according to the invention in a diagonal view in a first embodiment variant;

FIG. 2 shows an injection module in a diagonal view in a second embodiment variant;

FIG. 3 shows the injection module from FIG. 1 in a section along line III in FIG. 4;

FIG. 4 shows the injection module in a section along line IV-IV in FIG. 5;

FIG. 5 shows the injection module in a section along line V-V in FIG. 4;

FIG. 6 to FIG. 10 each show the injection module in a section in an embodiment variant similar to FIG. 3 with different cross sections;

FIG. 11 to FIG. 13 show exhaust gas purification devices in sections similar to FIG. 5 in various embodiment variants.

DETAILED DESCRIPTION OF THE DEPICTED EMBODIMENTS

FIG. 1 to FIG. 10 show a metering module 1 of an exhaust gas purification device 2 for an internal combustion engine, in particular a large-scale engine, for example, for stationary or marine uses. The metering module 1 comprises a housing 3, which encloses a main chamber 4. A mixing tube 5 is arranged in the main chamber 4, wherein the mixing tube 5 originates from a metering chamber 6, which is connected to the mixing tube inlet 7a. The mixing tube 5 comprises a first outlet 7b, wherein the interior 5a of the mixing tube 5 is separated from the main chamber 4. The jacket 5b of the mixing tube 5 is completely enclosed by the main chamber 4. The main chamber 4 comprises, on the lower side 3a of the metering module 1, at least one first inlet 8 and, on both sides 3b, 3c of the metering module 1, second outlets 9. The main chamber 4 is separated in a gas-tight manner from the metering chamber 6 by at least one separating wall 10.

At least one injection device 11 for a reducing agent for nitrogen oxides, for example, urea, discharges into the metering chamber 6. The metering chamber 6 has second inlets 12 for exhaust gas on each side 3b, 3c.

The metering module 1 is implemented as essentially symmetrical with respect to a longitudinal plane of symmetry e, which contains the longitudinal axis 5' of the mixing tube 5.

The housing 3, in particular the main chamber 4, can—viewed in the longitudinal direction of the longitudinal axis 5'—have a rectangular or square cross section, as shown in FIG. 3, FIG. 8, FIG. 9 and FIG. 10. However, it can also have a circular (FIG. 6) or oval (FIG. 7) cross section. The mixing tube 5 can also have a rectangular (FIG. 8) or oval cross section (FIG. 10) in addition to a circular cross section (FIG. 3, FIG. 6, FIG. 7, FIG. 9).

FIG. 11 shows an embodiment variant in which a connecting module 13 is flanged on each of the two sides of the metering module 1. Each connecting module 13 establishes the flow connection between the second outlets 9 from the main chamber 4 and the second inlets 12 into the metering chamber 6. The connecting module 13 can comprise diesel oxidation catalytic converters DOC in the region of the outlet opening 9, for example, as shown in FIG. 12. Furthermore, diesel particle filters DPF can be arranged in the connecting module 13 (see FIG. 13).

As is apparent from FIG. 11 to FIG. 13, a catalytic converter module 14 can be flanged onto the first outlet 7b from the mixing tube 5, wherein the catalytic converter module 14 can comprise multiple SCR catalytic converters. The catalytic converter module 14 has a further mixing tube 15 in its interior in extension of the mixing tube 5.

The metering chamber 6 can be formed by a welded component, as illustrated in FIG. 1 and FIG. 5. Alternatively to the welded embodiment, the metering chamber 6 can also be cast (see FIG. 2).

One or multiple injection devices 11 can discharge into the metering chamber 6.

The path of the exhaust gases is indicated in FIG. 3 to FIG. 7 and FIG. 11 to FIG. 13 by arrows. The exhaust gas flows—coming from the turbocharger (not further visible) of the internal combustion engine—via the exhaust gas line 16 and the first inlet 8 on the lower side 3a of the housing 3 into the main chamber 4 and flows around the jacket 5b of the mixing tube 5 therein. The mixing tube 5 is thus heated. After flowing around the mixing tube 5, the exhaust gas exits through the lateral second outlets 9 into the connecting module 13 and—optionally via oxidation catalytic converters DOC and/or particle filters DPF—by passing the second inlets 12, reaches the metering chamber 6, where reducing agent is injected via the injection devices 11. The exhaust gas flows out of the metering chamber 6 together with the reducing agent injected via the injection devices 11 into the mixing tube 5, where—because of the high wall temperature of the mixing tube 5—rapid vaporization of the reducing agent is achieved. The exhaust gas leaves the metering module 1 through the first outlet 7b and reaches the further mixing tube 15 of the connected catalytic converter module 14. After leaving the further mixing tube 15, the exhaust gas flows through the SCR catalytic converters SCR and then leaves the exhaust gas posttreatment device 2 via discharge lines (not shown in greater detail).

This symmetrical inflow of the exhaust gas into the metering chamber 6 enables rapid mixing between the reducing agent and the exhaust gas.

The mixing tube 5 is positioned in the metering module 1 so that the hot engine exhaust gas flows around the mixing tube 5, to keep the wall temperatures high in all operating conditions. Due to the high wall temperature of the mixing tube 5, rapid vaporization of the reducing agent is performed and therefore fewer deposits occur in the mixing tube 5.

Due to the good mixing because of the symmetrical inflow of the exhaust gas into the metering chamber 6, the use of an additional mixer and the pressure loss and higher costs thus resulting can be avoided, and at the same time the length of the further mixing tube 15 in the catalytic converter module 14 can be kept relatively short. Typical urea injection nozzles from utility vehicle construction can be used as the injection device 11.

The modular construction of the exhaust gas purification device 2 enables the same designed to be used for various applications, for example, for non-gen set (off-road), gen set (stationary engine), and marine uses.

The exhaust gas of the internal combustion engine is guided via separate exhaust gas lines 16 extending into the main chamber 4. The first inlet 8 into the main chamber 4 can be made flexible, depending on the requirement and installation space. For example, a single first inlet 8 can be used for in-line engines or two separate first inlets (not shown) can be used for V-type engines.

In applications having oxidation catalytic converters DOC and particle filters DPF, one or more HC metering devices 17 can optionally be arranged in the exhaust gas line 16 for the diesel particle filter regeneration upstream of the first inlet 8, as shown by dashed lines in FIG. 1. The second outlets 9 from the main chamber 4 are arranged on both sides 3b, 3c, to enable symmetrical flow in the metering chamber 6. However, alternatively thereto, a flexible design of the second outlets 9 out of the main chamber 4 is also possible having one, two, three, or more openings, for example.

The injection devices 11 can be fastened directly on the metering chamber 6, or can be installed as an injection module 11a on the metering chamber 6 (see FIG. 1 and FIG. 2). Depending on the requirement, one, two, three, four, or more injection devices 11 can be used.

Because of the design of the metering chamber 6, cost-effective mass-produced injection devices 11 from the utility vehicle field can be used. This metering is performed in this case without compressed air assistance. However, it is also possible to use injection devices having additional compressed air assistance, for example, from marine engines.

The mixing tube 5 is integrated in the main chamber 4 and hot engine exhaust gas flows around it in all operating conditions. To achieve uniform ambient flow, it is advantageous to position the mixing tube 5 centrally. However, alternatively thereto, an eccentric arrangement is also possible in principle.

To compensate for thermal expansions, the catalytic converter module 14 can be fastened, for example, via a compensator 18 on the first outlet 7b from the mixing tube 5.

To reduce manufacturing costs, the same metering module 1 can be used in various applications. The piece count is thus increased and the manufacturing costs become less.

The invention claimed is:

1. An exhaust gas purification device for an internal combustion engine having an injection module for a reducing agent, in particular urea, having a housing comprising a main chamber, in which main chamber a mixing tube is arranged downstream of a metering chamber, into which the reducing agent is injected via at least one injection device, wherein the injection module for exhaust gas has at least one first inlet into the main chamber and at least one first outlet out of the mixing tube, wherein the metering chamber has at least one second inlet for exhaust gas and the main chamber has at least one second outlet for exhaust gas, and the main chamber is separated from the metering chamber and from the interior of the mixing tube in a gas-tight manner.

2. The exhaust gas purification device according to claim 1, wherein the main chamber is separated from the metering chamber by at least one separating wall.

3. The exhaust gas purification device according to claim 1, wherein the main chamber has at least two second outlets arranged on different sides of the housing in relation to a longitudinal plane of symmetry of the injection module.

4. The exhaust gas purification device according to claim 1, wherein the metering chamber has at least two second inlets arranged on different sides of the housing in relation to a longitudinal plane of symmetry of the injection module.

5. The exhaust gas purification device according to claim 1, wherein the main chamber completely encloses the lateral surface of the mixing tube.

6. The exhaust gas purification device according to claim 1, wherein at least one connecting module is flanged onto the injection module, wherein the connecting module forms a flow connection of the second outlet from the main chamber and the second inlet into the metering chamber, wherein at least one connecting module is arranged in each case on different sides of the housing-in relation to a longitudinal plane of symmetry of the injection module.

7. The exhaust gas purification device according to claim 6, wherein the connecting module comprises at least on catalytic converter, and/or at least one particle filter (DPF).

8. The exhaust gas purification device according to claim 1, wherein at least one catalytic converter module having at least one catalytic converter is connected to the first outlet.

9. The exhaust gas purification device according to claim 6, wherein at least one injection device discharges into the metering chamber in the region of the longitudinal plane of symmetry.

10. The exhaust gas purification device according to claim 1, wherein the mixing tube and/or the main chamber have a circular, oval, or rectangular cross section.

* * * * *